(12) United States Patent
Maguire et al.

(10) Patent No.: US 9,877,185 B2
(45) Date of Patent: Jan. 23, 2018

(54) TECHNIQUES FOR PHONE NUMBER AND DATA MANAGEMENT

(71) Applicant: Facebook, Inc., Menlo Park, CA (US)

(72) Inventors: Yael Maguire, Boston, MA (US); Damian Kowalewski, Sunnyvale, CA (US); Giovanni Coglitore, Saratoga, CA (US); Aaron Bernstein, San Carlos, CA (US); Fraidun Akhi, Menlo Park, CA (US)

(73) Assignee: FACEBOOK, INC., Menlo Park, CA (US)

(*) Notice: Subject to any disclaimer, the term of this patent is extended or adjusted under 35 U.S.C. 154(b) by 161 days.

(21) Appl. No.: 14/286,873

(22) Filed: May 23, 2014

(65) Prior Publication Data

US 2015/0079961 A1  Mar. 19, 2015

Related U.S. Application Data

(60) Provisional application No. 61/877,644, filed on Sep. 13, 2013.

(51) Int. Cl.

| | |
|---|---|
| *H04M 3/00* | (2006.01) |
| *H04W 8/20* | (2009.01) |
| *H04W 4/20* | (2009.01) |
| *H04L 29/06* | (2006.01) |
| *H04L 29/08* | (2006.01) |
| *H04W 8/18* | (2009.01) |

(Continued)

(52) U.S. Cl.
CPC ......... *H04W 8/205* (2013.01); *H04L 63/0853* (2013.01); *H04L 67/1095* (2013.01); *H04W 4/206* (2013.01); *H04M 1/72522* (2013.01); *H04W 8/183* (2013.01); *H04W 12/06* (2013.01)

(58) Field of Classification Search
CPC combination set(s) only.
See application file for complete search history.

(56) References Cited

U.S. PATENT DOCUMENTS

| | | | |
|---|---|---|---|
| 7,369,851 | B2 | 5/2008 | Okonnen et al. |
| 8,275,415 | B2 | 9/2012 | Huslak |
| 8,364,205 | B2 | 1/2013 | Tsai et al. |

(Continued)

FOREIGN PATENT DOCUMENTS

| | | |
|---|---|---|
| EP | 1383352 | 1/2004 |

OTHER PUBLICATIONS

Office Action received for U.S. Appl. No. 14/339,087, dated Jul. 1, 2016, 15 pages.

(Continued)

*Primary Examiner* — Idowu O Osifade

(57) ABSTRACT

Techniques for phone number and data management are described. A storage module may be configured to store contact information for a plurality of users, which may be members of a social network. A server device may be configured to receive a SIM change event from a mobile device associated with a first user of the plurality of users. The SIM change event may include updated contact information for the first user. The server may further be configured to identify one or more users from the plurality of users associated with the first user, and provide the updated contact information to one or more mobile devices associated with the one or more identified users.

21 Claims, 9 Drawing Sheets

(51) Int. Cl.
    *H04M 1/725*    (2006.01)
    *H04W 12/06*    (2009.01)

(56) References Cited

U.S. PATENT DOCUMENTS

| | | |
|---|---|---|
| 2002/0154632 A1 | 10/2002 | Wang et al. |
| 2003/0153356 A1 | 8/2003 | Liu |
| 2007/0167167 A1 | 7/2007 | Jiang |
| 2008/0240052 A1 | 10/2008 | Gupta et al. |
| 2010/0198854 A1 | 8/2010 | Chitturi et al. |
| 2011/0069661 A1 | 3/2011 | Waytena, Jr. et al. |
| 2011/0196884 A1 | 8/2011 | Gandhi et al. |
| 2012/0033658 A1 | 2/2012 | Ganesan |
| 2012/0135715 A1 | 5/2012 | Kang et al. |
| 2012/0299814 A1 | 11/2012 | Kwon et al. |
| 2013/0065557 A1 | 3/2013 | Zhang et al. |
| 2013/0173756 A1 | 7/2013 | Luna et al. |
| 2013/0205366 A1 | 8/2013 | Luna et al. |
| 2013/0210484 A1 | 8/2013 | Jeenagala et al. |
| 2013/0237200 A1* | 9/2013 | Nystrom et al. ............. 455/418 |
| 2013/0329638 A1 | 12/2013 | Ren et al. |
| 2014/0003261 A1 | 1/2014 | Gillett et al. |

OTHER PUBLICATIONS

Office Action received for U.S. Appl. No. 14/339,087, dated Dec. 9, 2015, 18 pages.
Office Action received for U.S. Appl. No. 14/339,087, dated Feb. 17, 2017, 15 pages.

\* cited by examiner

TECHNIQUES FOR PHONE NUMBER AND DATA MANAGEMENT

RELATED APPLICATION

This application claims the benefit of priority under 35 U.S.C. §119(e) to U.S. Provisional Application No. 61/877,644, filed Sep. 13, 2013, which is hereby incorporated by reference in its entirety.

BACKGROUND

A mobile device, such as a mobile telephone, may include a subscriber identity module (SIM), either physical or virtual, which may store information such as an integrated circuit card identifier (ICCID), international mobile subscriber identify (IMSI), authentication keys, local area identity (LAI), operator specific emergency number, short message service center number (SMSC), user phone number, service provider name (SPN), service dialing numbers (SDN), advice-of-charge parameters, value added service (VAS) applications, and mobile network codes (MNC). In addition, a SIM may include SMS messages and contact information.

Some online services, such as social networks, may store contact information for users. However, if a user were to use a new SIM with a mobile device, but forget to update contact information associated with a new SIM on a social network, other users accessing the user's contact information via the social network will not be updated with the new contact information. The use of old contact information may lead to missed communications. As such, a desire exists for a system and method for updating contact information associated with a SIM card with a central contact database of an online service, such as a social network.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for phone number and data management. Some embodiments are particularly directed to techniques for phone number and data management in a social networking environment when members of the social network may use one or more SIMs or telephone numbers with a device. In an embodiment, a storage module may be configured to store contact information for a plurality of users, which may be members of a social network. A server device may be configured to receive a SIM change event from a mobile device associated with a first user of the plurality of users. The SIM change event may include updated contact information for the first user. The server may further be configured to identify one or more users from the plurality of users associated with the first user, and provide the updated contact information to one or more mobile devices associated with the one or more identified users.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Various embodiments are generally directed to techniques for phone number and data management in an online service, such as a social networking environment. Some embodiments are particularly directed to techniques for updating contact information stored by a social network, and distributing updated contact information to members of the social network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Figure 1:
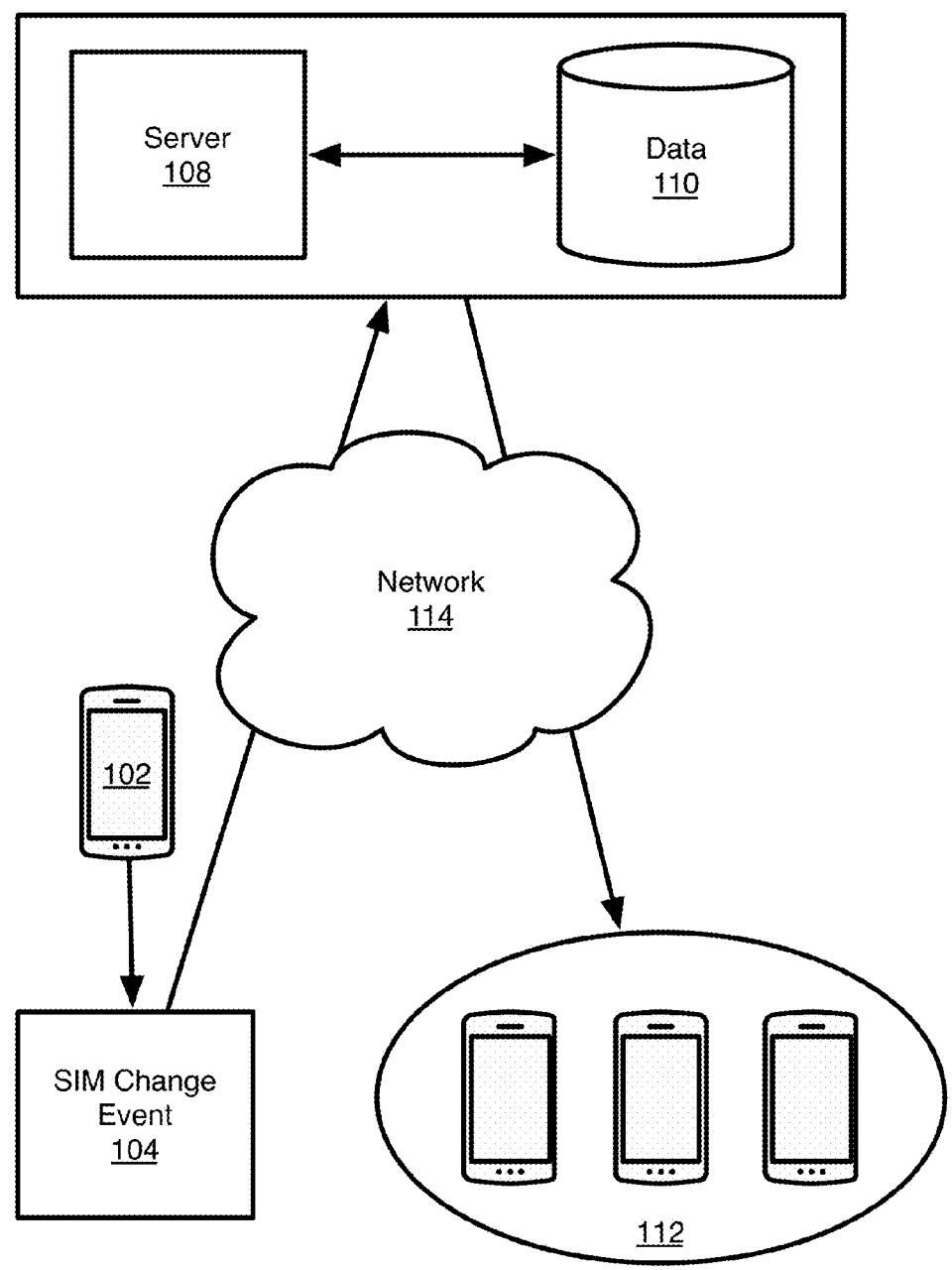
FIG. 1 illustrates an embodiment of a system.

FIG. 1 illustrates one embodiment of a system 100. The system 100 may be representative of some or all of the operations executed by one or more embodiments described herein. A mobile device 102, which may be similar to that described herein with respect to FIG. 5, may register a SIM change event at block 104. A SIM change event may take place when a new SIM is inserted into mobile device 102 (e.g. by a user or operator of mobile device 102), or when a new virtual SIM is chosen by the user or software as the active SIM within a device (e.g. if the device has multiple SIMs). For example, in an embodiment, mobile device 102 may utilize dual-SIM-dual-standby (DSDS) or triple-SIM-triple-standby (TSTS). When utilizing DSDS or TSTS, for example, a mobile device may use one or more software modules to logically swap SIMs. As such, a user interface may be provided to the user that allows for the choice of two or more SIMs, one of which may be chosen as the active SIM. In any event, updating a real or virtual SIM may modify contact information, such as a phone number assigned to mobile device 102 by a carrier. In some embodiments, the use of multiple SIMs may allow a user to assign a particular SIM during selected dates and times. For example, in addition to switching between SIMs, a user interface may allow a user to assign a particular SIM during particular days and hours. In one example, a work SIM may be chosen during weekday working hours, while a personal SIM may be chosen outside of working hours during the week and during weekends.

In an embodiment, a SIM change event may be registered with a software module in mobile device 102, which may be running as a part of the operating system or an application running on mobile device 102. Once registered, the SIM change event may be registered with a social network or other service, including server 108 and central storage 110. Communication may take place over network 114 in a manner consistent with the communication framework described within FIG. 8, discussed further herein. Central storage 110 may include a contact database and information regarding a social graph of a user, for example. In an embodiment, updated contact information may be pushed to server 108 in response to a SIM change event. In another embodiment, updated contact information may be periodically pulled from mobile device 102 and transmitted to server 108, for example, when a user uses mobile device 102 to access a social network.

Server 108 may be updated with new contact information, such as a phone number or other identifying information for a user or mobile device. In an embodiment, updated contact information is transmitted over a network 114 and saved into one or more storage devices, such as central storage 110, by server 108.

Once the contact information has been updated at server 108, the updated contact information may be disseminated to users 112, who may be members of the same social network as the user of mobile device 102, for example. For example, users 112 may include a full social graph of a user, or a subset of a user's social graph, such as business contacts, close friends, family, or classmates. In an embodiment, users 112 may be a subset of users chosen by a user of mobile device 102 to receive contact information updates. Further, users 112 may subscribe, or follow, contact information updates of other users, such as the user of mobile device 102. Each of users 112 may use a mobile device similar to mobile device 102, which may include a database of contact information.

In an embodiment, updated contact information may be pushed over a network to one or more users of a social network, either immediately or periodically. In this manner, updated contact information may be disseminated a short time period after a SIM change event has been registered at server 108. In situations where users have limited bandwidth or data resources, a SIM change event may trigger an instruction from a social network to an application on a mobile device instructing the application to obtain updated contact information using a peer-to-peer connection. In this embodiment, a peer-to-peer solution, such as Wi-Fi Direct, Bluetooth, or Wi-Fi, may be used to exchange contact information with one or more other mobile devices of users 112. For example, a first mobile device of users 112 may already have received updated contact information from server 108. Other mobile devices of users 112 may reduce the use of data resources used to connect to server 108 by establishing a peer-to-peer connection with the first mobile device and requesting the already-received contact information using a local peer-to-peer connection.

Further, in some cases, SMS short codes may be used to transmit new contact information, such as a new telephone number, to users of a social network. In some embodiments, updated contact information may be pulled by mobile devices of users 112, either periodically, or in response to actions taken using an application. In another example, as described in more detail below with respect to FIG. 2, updated contact information may be provided to users 112 upon initiating contact with the user of mobile device 102.

In some embodiments, contact information may be updated on multiple user devices using pointers to contact information stored at a central storage location. For example, a central storage location, such as central storage 110, may include a database of all known telephone numbers, or a known set of telephone numbers. Upon receiving a SIM change event at server 108, one or more mobile devices, such as mobile devices 112, may be sent a new pointer to a new telephone number for a particular contact. While the data differential between a single telephone number and a new pointer may be relatively small, when sending a new telephone number to hundreds or thousands of contacts, the use of a pointer may provide significant memory storage savings.

Figure 2:
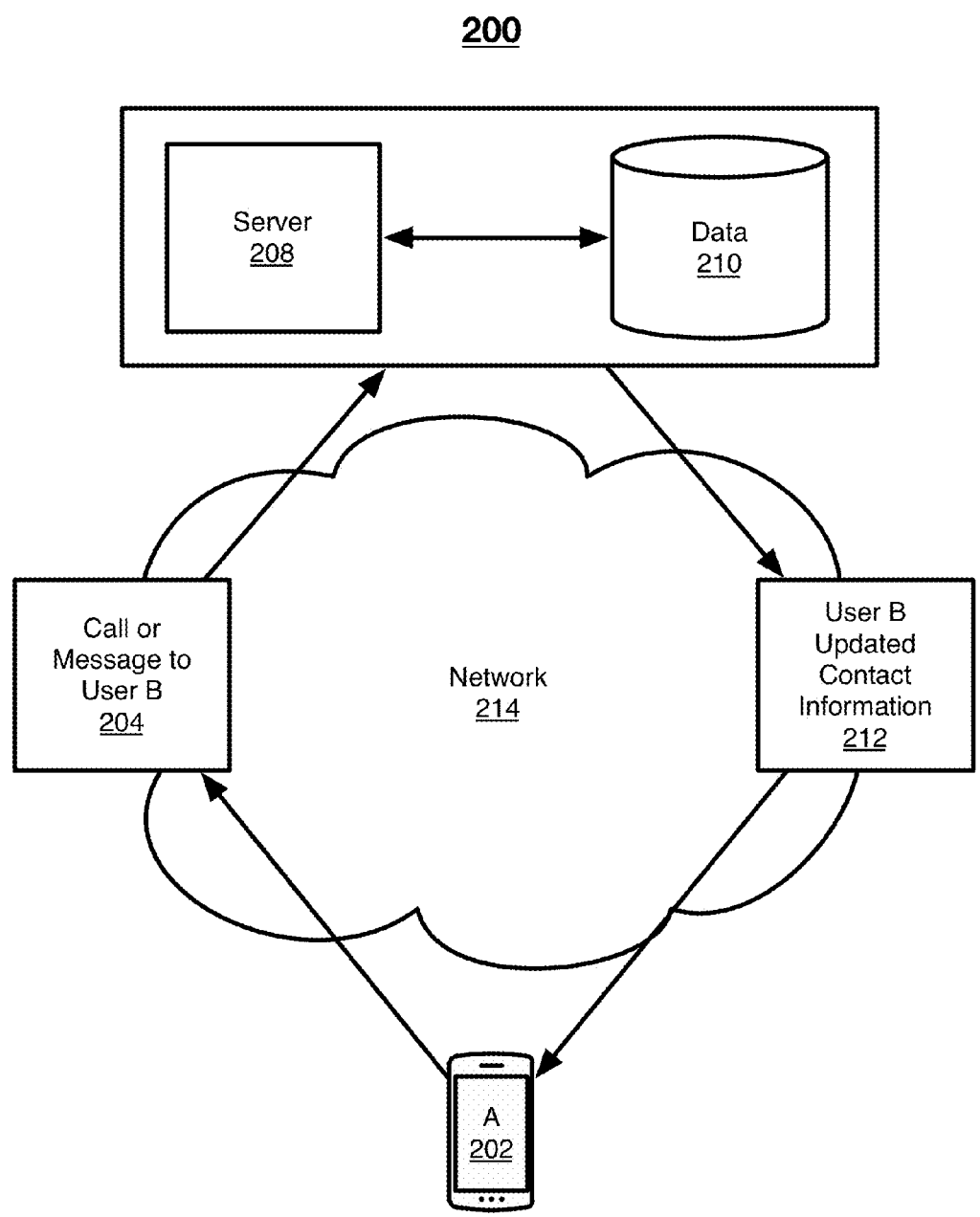
FIG. 2 illustrates an embodiment of a system.

FIG. 2 illustrates one embodiment of a system 200. The system 200 may be representative of some or all of the operations executed by one or more embodiments described herein. A mobile device 202, which may be similar to that described herein with respect to FIG. 5, may be used by a User A to contact a User B at block 204. For example, User A may use an application on mobile device 202 to send a SMS message, data message, or other communication such as a phone call to User B.

Prior to connecting to User B or otherwise sending a communication to User B, an application on User A's mobile device 202 may perform a check with a social network or other service, including server 208 and central storage 210. Central storage 210 may include a contact database and information regarding a social graph of a user, for example. In an embodiment, updated contact information may be pushed to server 208 in response to a SIM change event, as described with respect to FIG. 1. Server 208 may be updated with new contact information, such as a phone number or other identifying information for a user or mobile device. In an embodiment, updated contact information is transmitted over a network and saved into one or more storage devices, such as central storage 210, by server 208.

Figure 9:
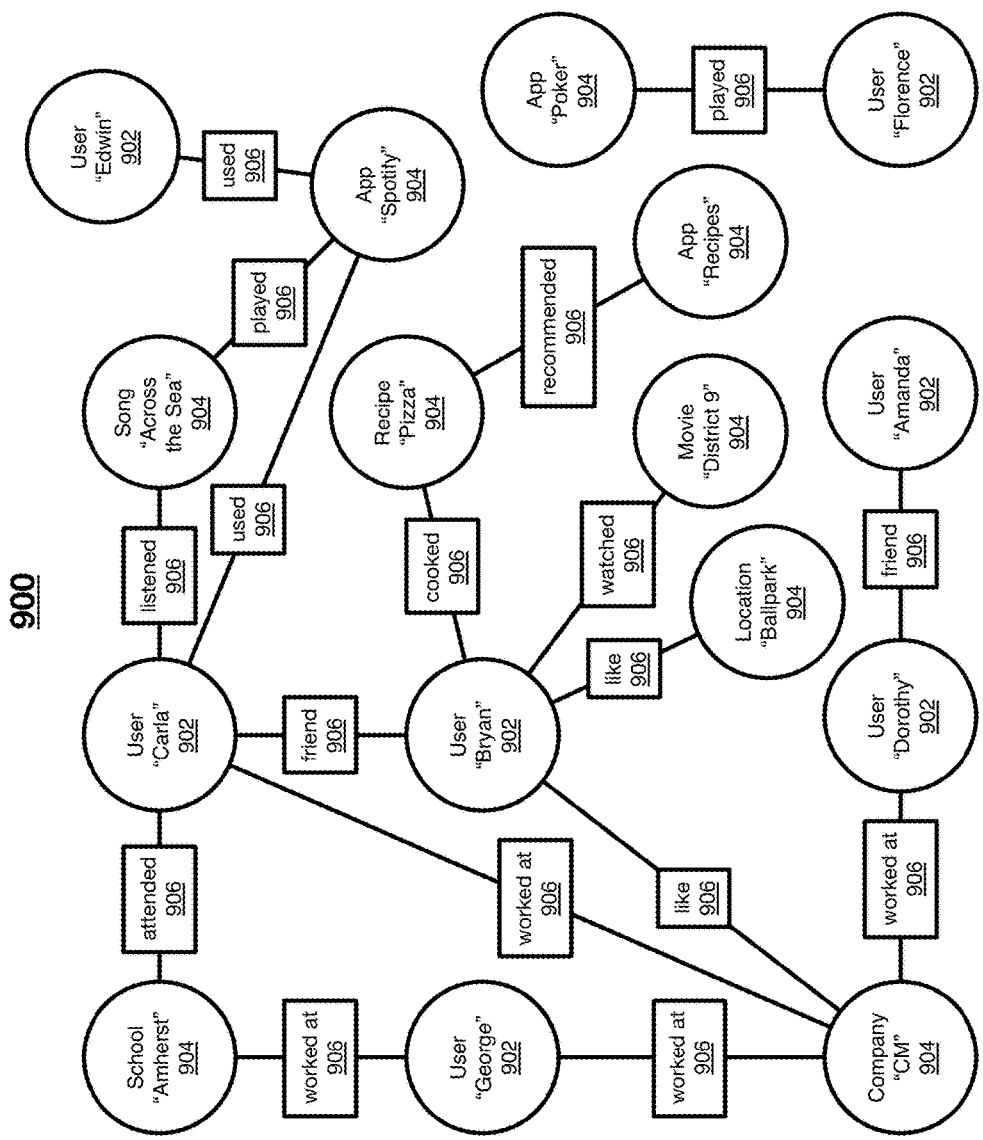
FIG. 9 illustrates an embodiment of a social graph.

In one example, an application may first determine if User B is within User A's social graph, as described in more detail with respect to FIG. 9. In one example, User A's mobile device 202 may perform a check with a social network or other service, including server 208 and central storage 210, as to whether User A and User B are connected via a social graph. Central storage 210 may include a contact database and information regarding a social graph of a user, for example. If so, server 208 may perform a check as to whether User A has the current contact information for User B. Further, server 208 may first determine whether User B has allowed User A to be provided with updated contact information. For example, server 208 may determine whether User A is a member of one or more subsets of User B's social graph (friend, coworker, family, etc.). A social network may include one or more privacy settings that allow a user to define who may be updated with contact information. Privacy settings may allow a user to place other users into groups, such as friend, coworker, or family, and may allow a user to identify particular groups, or individual users, that may be updated with contact information using the techniques described herein. In some examples, privacy settings may provide the option to block particular users, or groups of users, or all users, from being updated with contact information.

The system 200 at block 212 sends updated contact information for User B to mobile device 202 of User A. Thus, User A may be provided with updated contact information for User B prior to completing a communication with User B. In this manner, updated contact information need not be communicated to User A until a communication with User B is initiated. As such, data costs may be avoided since contact information for a user, such as User B, will not be provided unless some form of communication is first initiated by User A.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
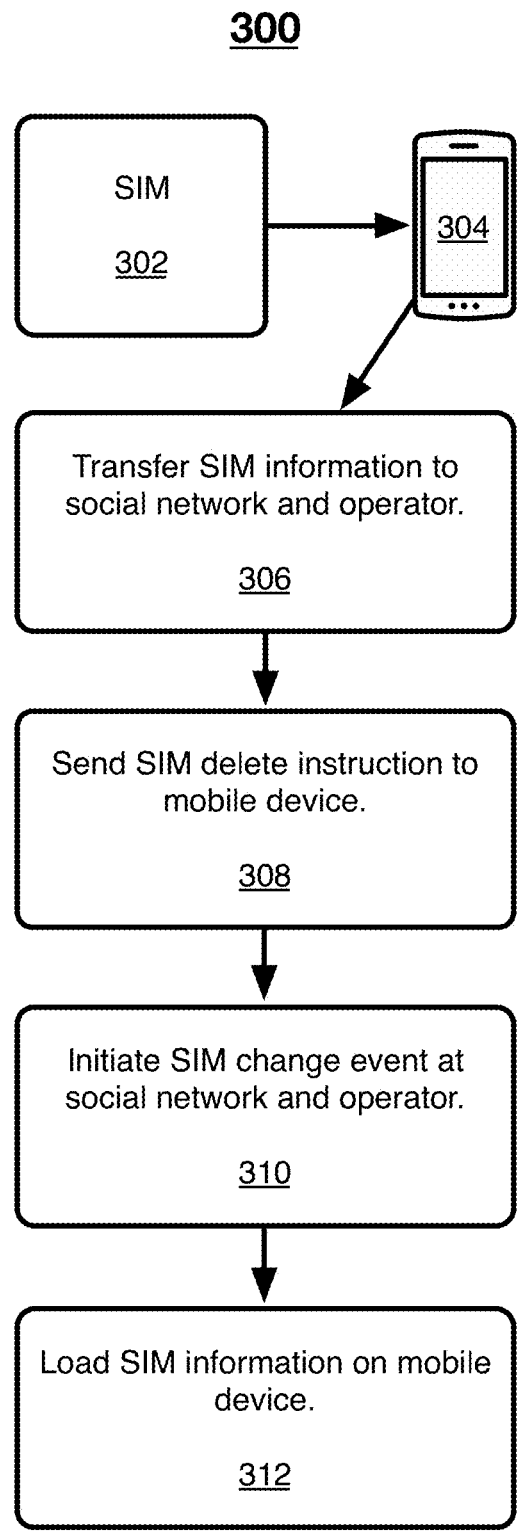
FIG. 3 illustrates an embodiment of a logic flow.

FIG. 3 illustrates one embodiment of a logic flow 300. The logic flow 300 may be representative of some or all of the operations executed by one or more embodiments described herein. Logic flow 300 at block 306 may transfer SIM information to a social network and/or operator. A SIM 302 may be inserted into mobile device 304. Mobile device 304 may include a storage area for one or more SIM card data sets, which may be physical or virtual. This storage area may be a protected area of flash or a dedicated IC for multi-SIM management. Each SIM card data set may include at least a minimum amount of information required to operate the mobile device on a mobile network. Further, a user interface may be provided to the user to switch between virtual SIMs. Upon detection of a new SIM or selection of a new virtual SIM, an application running on mobile device 304 may contact both a mobile network operator and/or a social network or other service over a network connection, which may include cellular or Wi-Fi data connection, and transfer SIM information, such as private key data and IMSI, for example.

Logic flow 300 at block 308 may send a SIM delete instruction to mobile device 304, which may instruct the device to delete some or all information from the SIM. In this manner, the SIM data may erased from the SIM card and may only be temporarily accessible by the mobile operator and social network, thus providing a safeguard against copying or reusing SIMs. Further, since the mobile operator may be aware of all SIM changes and capable of managing acquired SIM information, the mobile operator may not be opposed to users using multiple SIMs in a single mobile device.

Logic flow 300 at block 310 initiates a SIM change event at one or both of the social network and mobile operator. The SIM change event may trigger an update to one or more databases indicating that a new SIM has been entered into the mobile device of a user. Further, the update may indicate that a particular SIM is to be loaded into a storage area of a mobile device. In this manner, the mobile operator and social network may keep track of a user's current contact information.

Logic flow 300 at block 312 loads SIM information onto mobile device 304. SIM information may be stored in a storage area for one or more SIM card data sets. Each SIM card data set may include at least a minimum amount of information required to operate the mobile device on a mobile network. For example, a SIM card data set may include an integrated circuit card identifier (ICCID), international mobile subscriber identity (IMSI), authentication keys, local area identity (LAI), operator specific emergency number, short message service center number (SMSC), user phone number, service provider name (SPN), service dialing numbers (SDN), advice-of-charge parameters, value added service (VAS) applications, and mobile network codes (MNC).

In an embodiment, mobile device 304 may include multiple SIM data sets. In this manner, a user may switch between multiple SIMs on a single device without the need of multi-SIM hardware. Further, since the SIMs are managed at the network level by the mobile operator and social network, the user's contacts may be updated with current contact information as described above with respect to FIGS. 1 and 2.

In some embodiments, mobile device 304 may include one or more applications for switching between SIM data sets. For example, an application recommendation engine may be used to switch between SIMs based upon a usage scenario. In an embodiment, a particular SIM may be chosen based upon whether the user is making a phone call, texting, using a data connection, or based upon the application used for a communication. Further, a particular SIM data set may be used based upon an amount of voice minutes or data usage remaining on a phone plan associated with a SIM data set. Still further, a particular SIM may be chosen based upon a network operator of a contact that is to be contacted by mobile device 304. For example, some mobile operators offer free minutes between mobile devices on the same network. Accordingly, a SIM that is associated with a mobile network operator used by the contact that is to be contacted by the mobile device 304 is chosen. Similarly, mobile operators may offer different data pricing tariffs at different points in time and for different uses. Accordingly, a SIM may be selected to minimize the data cost for the given time and/or use.

In an embodiment, a particular application, such as a messaging application, photo application, calling application, or VoIP application may be chosen for an action based upon a variety of factors. Factors may include which SIM data set has been chosen, a type of network connection that is available, or identification of an application used by a person to be contacted, for example.

In some embodiments, a user interface may be provided to indicate to a user when a SIM data set has been changed. Further, using the user interface, a user may select one or preferences related to switching between SIM data sets. Such preferences may include using a particular SIM data set for predefined actions such as calls, texts, or data. Further, a user may define preferences for SIM data sets to be used with particular contacts, subsets of a social graph, or certain times of time day, for example.

Figure 4:
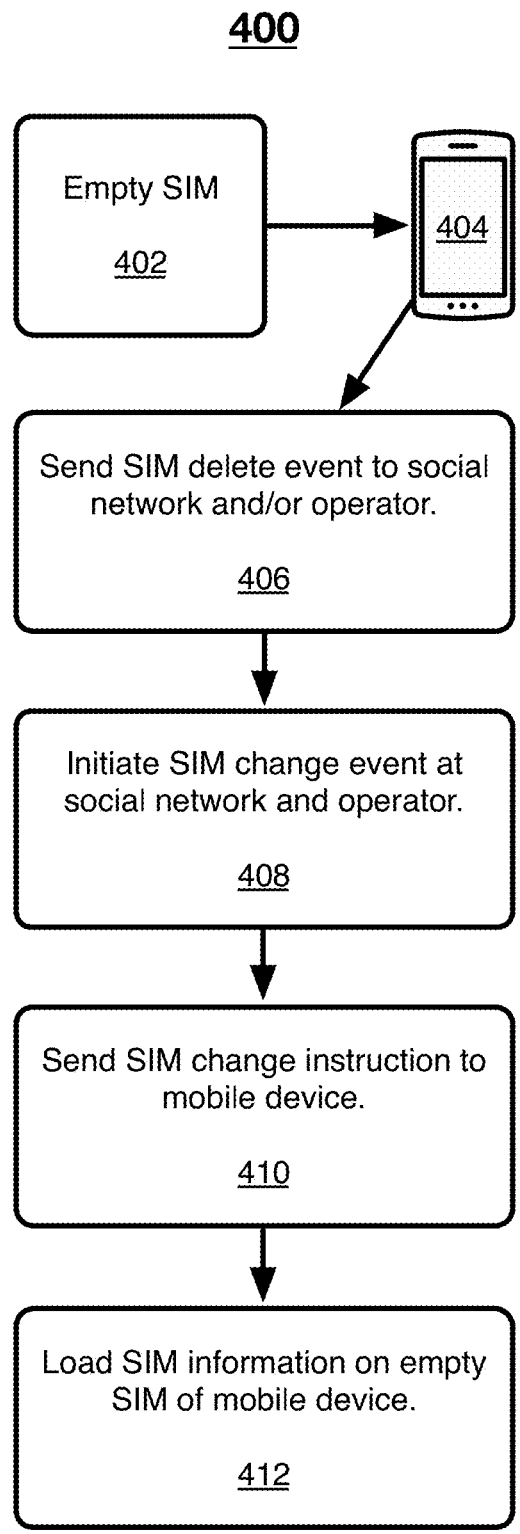
FIG. 4 illustrates an embodiment of a logic flow.

FIG. 4 illustrates one embodiment of a logic flow 400. The logic flow 400 may be representative of some or all of the operations executed by one or more embodiments described herein. Logic flow 400 at block 406 may send a SIM delete event to a social network and/or operator. In an embodiment, an empty SIM 402 may be inserted into mobile device 404 and a SIM delete event may be sent to a social network and network operating, confirming that the SIM is empty. An empty SIM 402 may also be indicative of a brand new device being added to the network by a user of a social networking system. Mobile device 404 may include a storage area for one or more SIM card data sets. Each SIM card data set may include at least a minimum amount of information required to operate the mobile device on a mobile network. Further, a user interface may be provided to the user to switch between virtual SIMs. Upon detection of a new SIM, an application running on mobile device 404 may contact one of, or both of, a mobile network operator and a social network or other service over a network connection, which may include cellular or Wi-Fi data connection, and transfer SIM information, such as private key data and IMSI, or an empty status of the SIM, for example.

Logic flow 400 at block 408 initiates a SIM change event at one or both of the social network and mobile operator. The SIM change event may trigger an update to one or more databases indicating that a new SIM has been entered into the mobile device of a user. Further, the update may indicate that a particular SIM is to be loaded into a storage area of a mobile device. In this manner, the mobile operator and social network may keep track of a user's current contact information.

Logic flow 400 at block 410 sends a SIM change instruction to mobile device 404, indicating that a SIM data set may be loaded on mobile device 404. SIM information may be stored in a storage area for one or more SIM card data sets, and in the case of an empty SIM, SIM information may be loaded onto a SIM from a mobile network operator, social network, or other service via a network connection at block 412. Each SIM card data set may include at least a minimum amount of information required to operate the mobile device on a mobile network. For example, a SIM card data set may include an ICCID, IMSI, authentication keys, LAI, operator specific emergency number, SMSC, user phone number, SPN, SDN, advice-of-charge parameters, VAS applications, and MNC.

Figure 5:
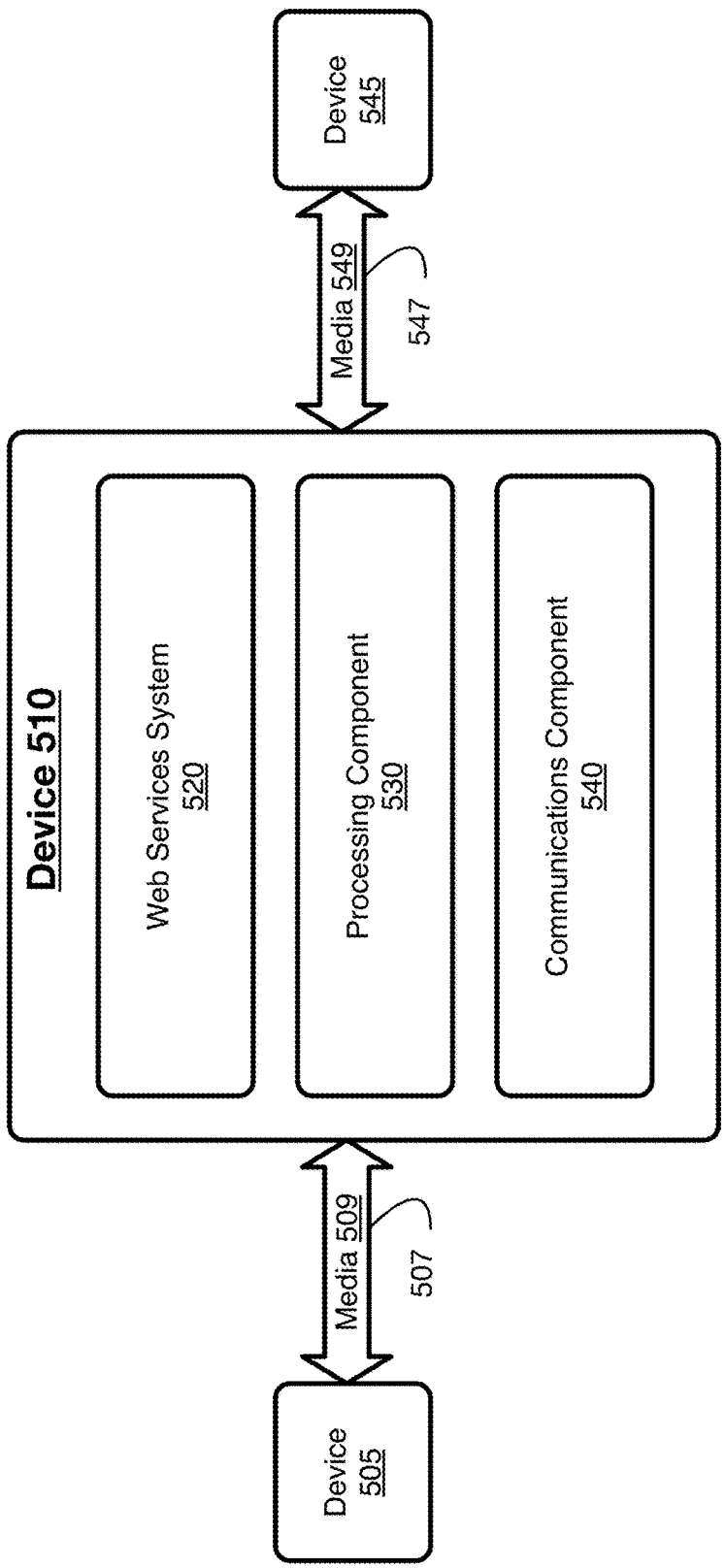
FIG. 5 illustrates an embodiment of a centralized system.

FIG. 5 illustrates a block diagram of a centralized system 500. The centralized system 500 may implement some or all of the structure and/or operations for the web services system 520 in a single computing entity, such as entirely within a single device 510.

The device 510 may comprise any electronic device capable of receiving, processing, and sending information for the web services system 520. Examples of an electronic device may include without limitation a mobile device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, multiprocessor systems, processor-based systems, consumer electronics, programmable consumer electronics, game devices, television, set top box, wireless access point, base station, subscriber station, mobile subscriber center, radio network controller, router, hub, gateway, bridge, switch, machine, or combination thereof. The embodiments are not limited in this context.

The device 510 may execute processing operations or logic for the web services system 520 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 510 may execute communications operations or logic for the web services system 520 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 509, 549 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 510 may communicate with other devices 505, 545 over a communications media 509, 549, respectively, using communications signals 507, 547, respectively, via the communications component 540. The devices 505, 545, may be internal or external to the device 510 as desired for a given implementation.

For example, device 505 may correspond to a client device such as a phone used by a user. Signals 507 sent over media 509 may therefore comprise communication between the phone and the web services system 520 in which the phone transmits a request and receives a web page or other data in response.

Device 545 may correspond to a second user device used by a different user from the first user, described above. In one embodiment, device 545 may submit information to the web services system 520 using signals 547 sent over media 549 to construct an invitation to the first user to join the services offered by web services system 520. For example, if web services system 520 comprises a social networking service, the information sent as signals 547 may include a name and contact information for the first user, the contact information including phone number or other information used later by the web services system 520 to recognize an incoming request from the user. In other embodiments, device 545 may correspond to a device used by a different user that is a friend of the first user on a social networking service, the signals 547 including status information, news, images, contact information, or other social-networking information that is eventually transmitted to device 505 for viewing by the first user as part of the social networking functionality of the web services system 520.

Figure 6:
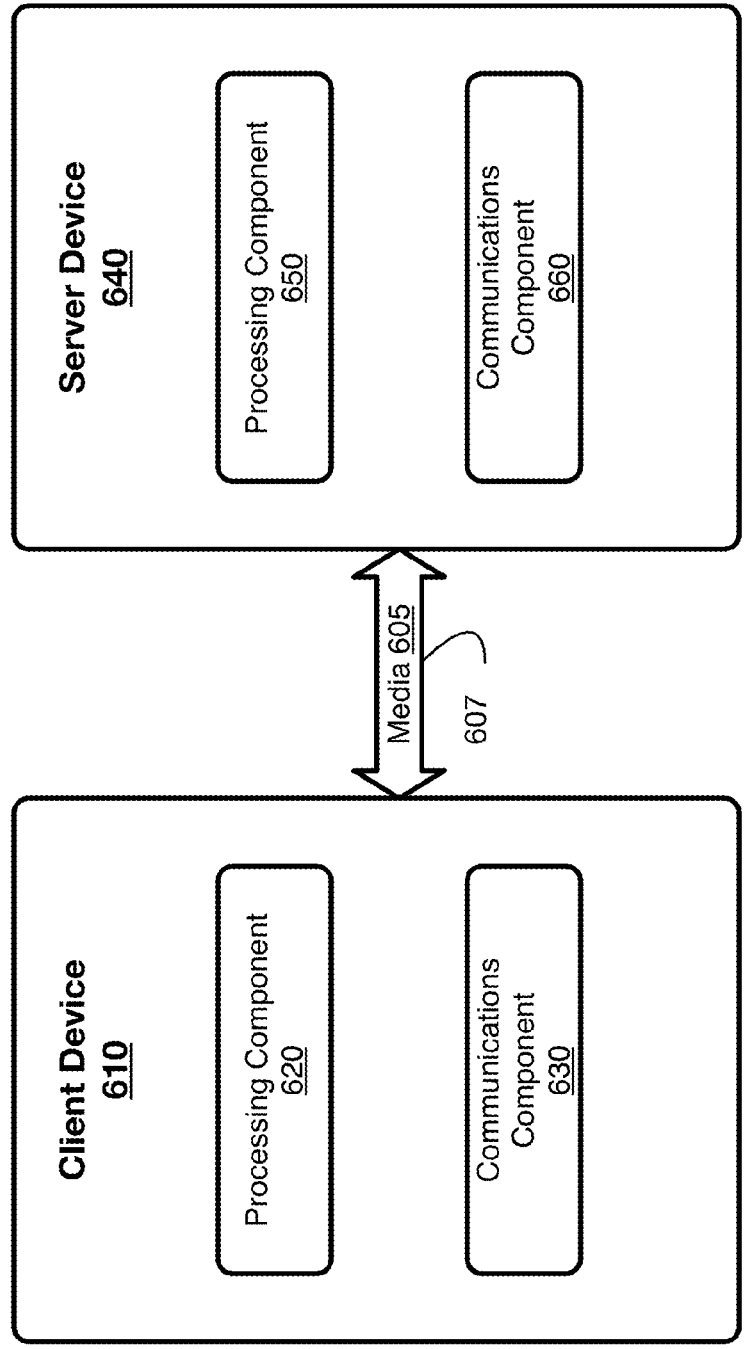
FIG. 6 illustrates an embodiment of a distributed system.

FIG. 6 illustrates a block diagram of a distributed system 600. The distributed system 600 may distribute portions of the structure and/or operations for the disclosed embodiments across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 640. In general, the client device 610 and the server device 640 may be the same or similar to the client device 510 as described with reference to FIG. 5. For instance, the client system 610 and the server system 640 may each comprise a processing component 620, 650 and a communications component 630, 660 which are the same or similar to the processing component 530 and the communications component 540, respectively, as described with reference to FIG. 5. In another example, the devices 610, 640 may communicate over a communications media 605 using communications signals 607 via the communications components 630, 660.

The client device 610 may comprise or employ one or more client programs that operate to perform various methodologies in accordance with the described embodiments. In one embodiment, for example, the client device 610 may implement some steps described with respect to FIGS. 3 and 4.

The server device 640 may comprise or employ one or more server programs that operate to perform various methodologies in accordance with the described embodiments. In one embodiment, for example, the server device 640 may implement some steps described with respect to FIGS. 3 and 4.

Figure 7:
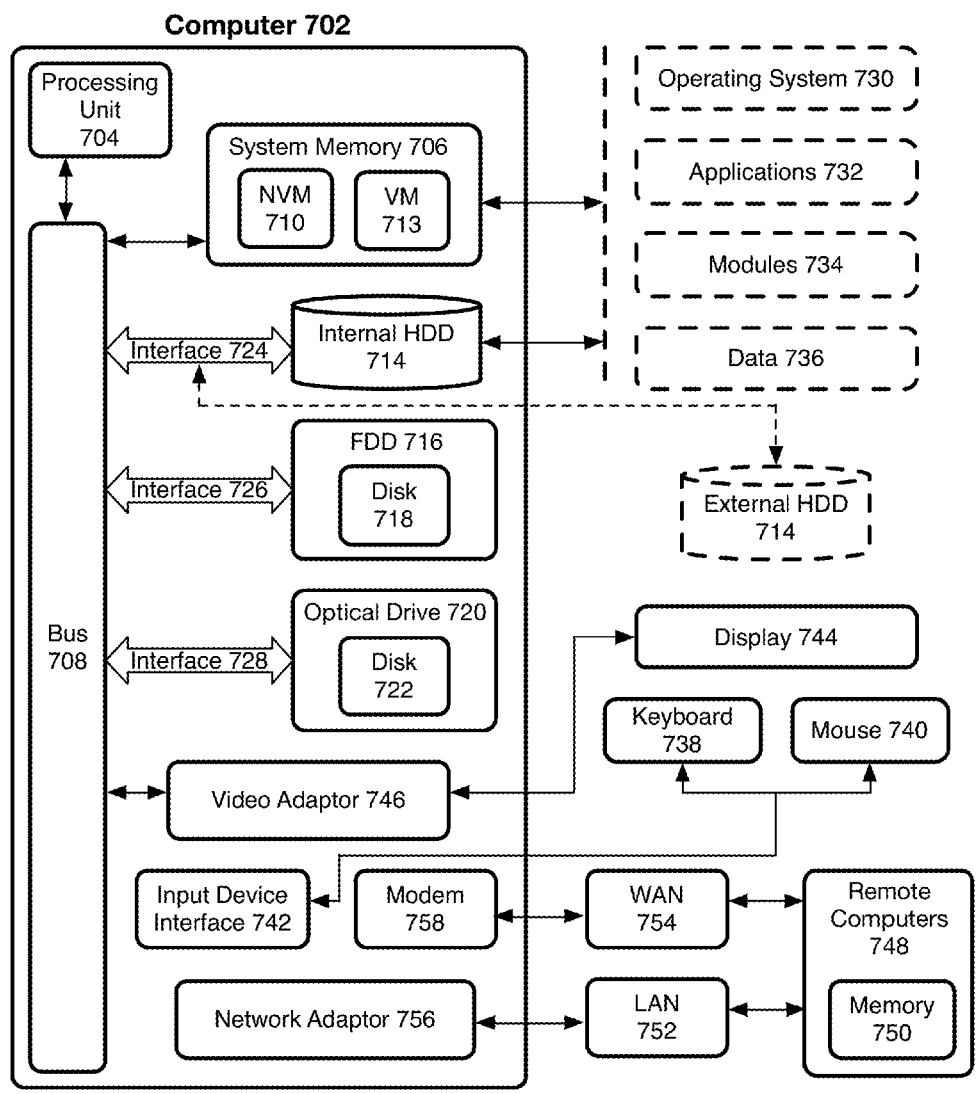
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 808 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 713. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM, DVD, or Blu-ray). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 713, including an operating system 730, one or more application programs 732, other program modules 734, and program data 736. In one embodiment, the one or more application programs 732, other program modules 734, and program data 736 can include, for example, the various applications and/or components to implement the disclosed embodiments.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A display 744 is also connected to the system bus 708 via an interface, such as a video adaptor 746. The display 744 may be internal or external to the computer 702. In addition to the display 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
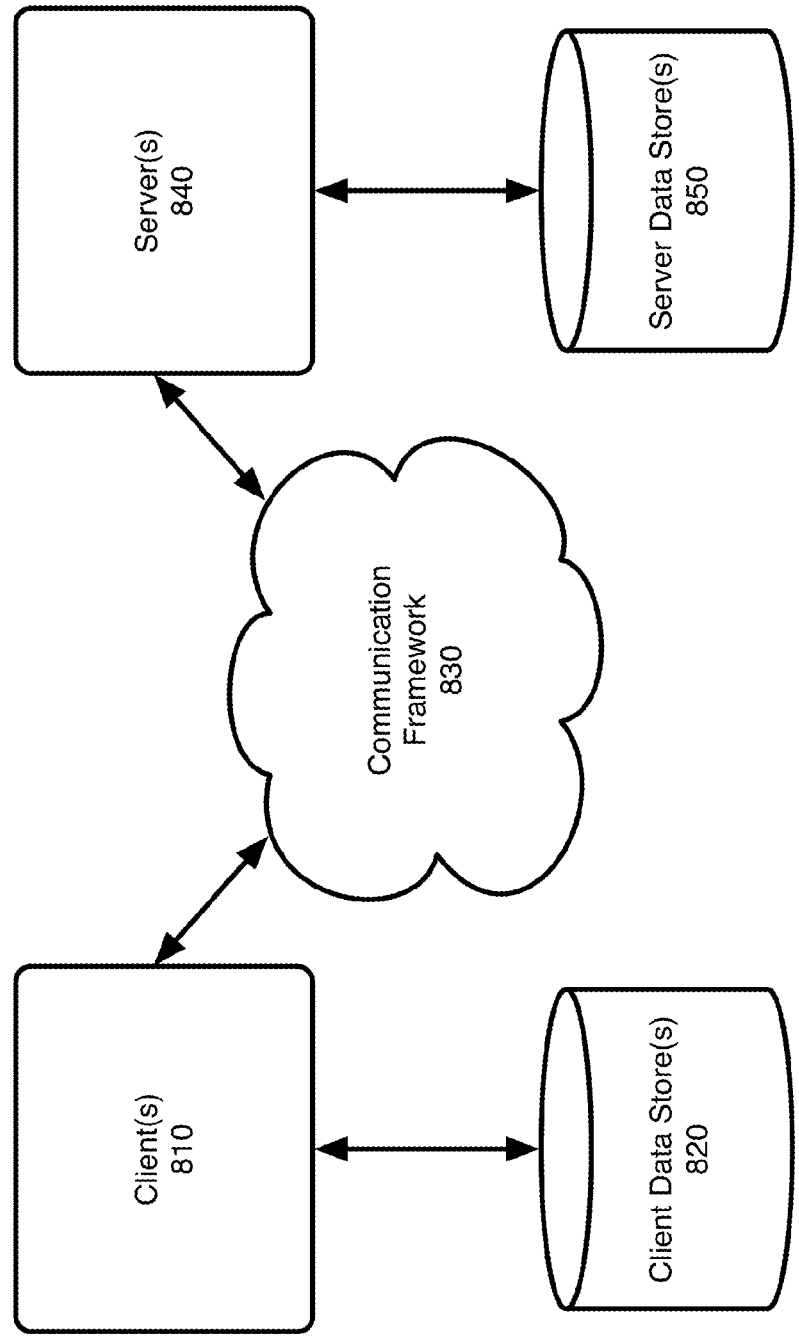
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 810 and servers 840. The clients 810 may implement the client device 610, for example. The servers 840 may implement the server device 640, for example. The clients 810 and the servers 840 are operatively connected to one or more respective client data stores 820 and server data stores 850 that can be employed to store information local to the respective clients 810 and servers 840, such as cookies and/or associated contextual information.

The clients 810 and the servers 840 may communicate information between each other using a communication framework 830. The communications framework 830 may implement any well-known communications techniques and protocols. The communications framework 830 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 830 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 810 and the servers 840. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

FIG. 9 illustrates an example of a social graph 900. In one or more of the embodiments described herein, a social graph may be accessed and data therefrom may be preloaded into a device, or accessed using user information preloaded into a device. In particular embodiments, a social-networking service may store one or more social graphs 900 in one or more data stores. In particular embodiments, social graph 900 may include multiple nodes, which may include multiple user nodes 902 and multiple concept nodes 904. Social graph 900 may include multiple edges 906 connecting the nodes. In particular embodiments, a social-networking service, client system, third-party system, or any other system or device may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of the social-networking service. As an example and not by way of limitation, a user may be an individual (human user), an entity (e.g., an enterprise, business, or third-party application), or a group (e.g., of individuals or entities) that interacts or communicates with or over the social-networking service. In particular embodiments, when a user registers for an account with the social-networking service, the social-networking service may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with the social-networking service. In particular embodiments, a user node 902 may be associated with information provided by a user or information gathered by various systems, including the social-networking service. As an example and not by way of limitation, a user may provide their name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including the social-networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number, SIM information as described above, or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to the social-networking service. Profile pages may also be hosted on third-party websites associated with a third-party server. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking service a message indicating the user's action. In response to the message, the social-networking service may create an edge (e.g., an "eat" edge) between a user node 1002 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, the social-networking service may send a "friend request" to the second user. If the second user confirms the "friend request," the social-networking service may create an edge 906 connecting the first user's user node 902 to the second user's user node 902 in social graph 900 and store edge 906 as social-graph information in one or more data stores. In the example of FIG. 9, social graph 900 includes an edge 906 indicating a friend relation between user nodes 902 of user "Amanda" and user "Bryan" and an edge indicating a friend relation between user nodes 1002 of user "Carla" and user "Bryan." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, the social-networking service may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking service may create a "listened" edge 906 and a "used" edge (as illustrated in FIG. 9) between user nodes 902 corresponding to the user and concept nodes 904 corresponding to the song and application to indicate that the user listened to the song and used the application. Moreover, the social-networking service may create a "played" edge 906 (as illustrated in FIG. 9) between concept nodes 904 corresponding to the song and the application to indicate that the particular song was played by the particular application. In this case, "played" edge 1006 corresponds to an action performed by an external application (SPOTIFY) on an external audio file (the song "Across the Sea"). Although this disclosure describes particular edges 906 with particular attributes connecting user nodes 902 and concept nodes 904, this disclosure contemplates any suitable edges 1006 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "Edwin" and concept node 904 for "SPOTIFY").

In particular embodiments, the social-networking service may create an edge 906 between a user node 902 and a concept node 904 in social graph 900. As an example and not by way of limitation, a user viewing a concept-profile page (such as, for example, by using a web browser or a special-purpose application hosted by the user's client system) may indicate that he or she likes the concept represented by the concept node 904 by clicking or selecting a "Like" icon, which may cause the user's client system to send to the social-networking service a message indicating the user's liking of the concept associated with the concept-profile page. In response to the message, the social-networking service may create an edge 906 between user node 902 associated with the user and concept node 904, as illustrated by "like" edge 906 between the user and concept node 904. In particular embodiments, the social-networking service may store an edge 906 in one or more data stores. In particular embodiments, an edge 906 may be automatically formed by the social-networking service in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:
1. A system, comprising:
  a storage device configured to store contact information for a plurality of users; and
  a server device configured to:
    receive a SIM change event from a mobile device associated with a first user of the plurality of users, the SIM change event including updated contact information for the first user;
    identify one or more users from the plurality of users associated with the first user; and
    provide the updated contact information to one or more mobile devices associated with the one or more identified users, wherein the updated contact information is stored by an online service and updated contact information is provided to the one or more mobile devices associated with the one or more identified users using a pointer to the stored updated contact information.

2. The system of claim 1, the plurality of users are members of a social network and the identified one or more users are members of a social graph including the first user.

3. The system of claim 2, the one or more identified users have been selected by the first user to receive the updated contact information.

4. The system of claim 1, the SIM change event indicates that a new SIM has been inserted in the mobile device or a new virtual-SIM has been assigned to the mobile device.

5. The system of claim 1, the updated contacted information is provided to the one or more mobile devices associated with the one or more identified users using push operations.

6. The system of claim 1, the updated contacted information is provided to each of the one or more mobile devices associated with the one or more identified users in response to each of the one or more identified users initiating a communication with the first user.

7. The system of claim 1, wherein the server device periodically pulls the updated contact information from the mobile device associated with the first user.

8. A computer-implemented method, comprising:
   storing, by a storage device, contact information for a plurality of users;
   receiving, by a server, a SIM change event from a mobile device associated with a first user of the plurality of users, the SIM change event including updated contact information for the first user;
   identifying, by the server, one or more users from the plurality of users associated with the first user; and
   providing, by the server, the updated contact information to one or more mobile devices associated with the one or more identified users, wherein the updated contact information is stored by an online service and updated contact information is provided to the one or more mobile devices associated with the one or more identified users using a pointer to the stored updated contact information.

9. The computer-implemented method of claim 8, the plurality of users are members of a social network and the identified one or more users are members of a social graph including the first user.

10. The computer-implemented method of claim 9, the one or more identified users have been selected by the first user to receive the updated contact information.

11. The computer-implemented method of claim 8, the SIM change event indicates that a new SIM has been inserted in the mobile device or a new virtual-SIM has been assigned to the mobile device.

12. The computer-implemented method of claim 8, the updated contacted information is provided to the one or more mobile devices associated with the one or more identified users using push operations.

13. The computer-implemented method of claim 8, the updated contacted information is provided to each of the one or more mobile devices associated with the one or more identified users in response to each of the one or more identified users initiating a communication with the first user.

14. The method of claim 8, wherein the server device periodically pulls the updated contact information from the mobile device associated with the first user.

15. An article comprising a non-transitory computer-readable storage medium including instructions that, when executed by a processor, cause a system to:
   store, by a storage device, contact information for a plurality of users;
   receive, by a server, a SIM change event from a mobile device associated with a first user of the plurality of users, the SIM change event including updated contact information for the first user;
   identify, by the server, one or more users from the plurality of users associated with the first user; and
   provide, by the server, the updated contact information to one or more mobile devices associated with the one or more identified users, wherein the updated contact information is stored by an online service and updated contact information is provided to the one or more mobile devices associated with the one or more identified users using a pointer to the stored updated contact information.

16. The article of claim 15, the plurality of users are members of a social network and the identified one or more users are members of a social graph including the first user.

17. The article of claim 16, the one or more identified users have been selected by the first user to receive the updated contact information.

18. The article of claim 15, the SIM change event indicates that a new SIM has been inserted in the mobile device or a new virtual-SIM has been assigned to the mobile device.

19. The article of claim 15, the updated contacted information is provided to the one or more mobile devices associated with the one or more identified users using push operations.

20. The article of claim 15, the updated contacted information is provided to each of the one or more mobile devices associated with the one or more identified users in response to each of the one or more identified users initiating a communication with the first user.

21. The article of claim 15, wherein the server device periodically pulls the updated contact information from the mobile device associated with the first user.

* * * * *